United States Patent
Shankar et al.

(10) Patent No.: US 7,142,891 B2
(45) Date of Patent: Nov. 28, 2006

(54) DEVICE BOUND FLASHING/BOOTING FOR CLONING PREVENTION

(75) Inventors: Narendar Shankar, Dallas, TX (US);
Erdal Paksoy, Richardson, TX (US);
Jerome L. Azema, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 110 days.

(21) Appl. No.: 10/800,513

(22) Filed: Mar. 15, 2004

(65) Prior Publication Data

US 2005/0079868 A1    Apr. 14, 2005

Related U.S. Application Data

(60) Provisional application No. 60/510,696, filed on Oct. 10, 2003.

(51) Int. Cl.
*H04Q 7/20* (2006.01)

(52) U.S. Cl. ............. 455/566; 455/550.1; 455/158.4; 709/219

(58) Field of Classification Search ........... 455/435.1, 455/418, 419, 420, 412.1, 412.2, 414.1, 550.1, 455/566, 158.4; 709/217–220; 707/104.1
See application file for complete search history.

(56) References Cited

U.S. PATENT DOCUMENTS

| | | | |
|---|---|---|---|
| 6,519,471 B1 * | 2/2003 | Yamaguchi | 455/517 |
| 6,640,306 B1 * | 10/2003 | Tone et al. | 726/4 |
| 6,788,928 B1 * | 9/2004 | Kohinata et al. | 455/411 |
| 6,912,399 B1 * | 6/2005 | Zirul et al. | 455/463 |
| 6,920,555 B1 * | 7/2005 | Peters et al. | 713/100 |
| 6,965,767 B1 * | 11/2005 | Maggenti et al. | 455/416 |
| 7,062,600 B1 * | 6/2006 | Yoo | 711/103 |
| 2002/0016909 A1 * | 2/2002 | Miyajima | 713/2 |
| 2002/0037714 A1 * | 3/2002 | Takae et al. | 455/419 |
| 2002/0082001 A1 * | 6/2002 | Tanaka et al. | 455/414 |
| 2002/0123331 A1 * | 9/2002 | Lehaff et al. | 455/414 |
| 2003/0005096 A1 * | 1/2003 | Paul et al. | 709/222 |
| 2003/0051128 A1 * | 3/2003 | Rodriguez et al. | 713/100 |
| 2003/0179405 A1 * | 9/2003 | Seto | 358/1.15 |
| 2004/0013246 A1 * | 1/2004 | Back et al. | 379/88.17 |
| 2004/0261073 A1 * | 12/2004 | Herle et al. | 717/173 |

* cited by examiner

Primary Examiner—CongVan Tran
(74) Attorney, Agent, or Firm—Ronald O. Neerings; W. James Brady, III; Frederick J. Telecky, Jr.

(57) ABSTRACT

A method comprising downloading a boot image onto a mobile communication device and generating a device-bound certificate ("DBC"). The DBC preferably comprises an authentication code generated using a hashed message authentication code algorithm and a key specific to the device. The method may further comprise storing the DBC on the boot image, thus binding the boot image to the mobile communication device.

30 Claims, 2 Drawing Sheets

DEVICE BOUND FLASHING/BOOTING FOR CLONING PREVENTION

PRIORITY CLAIM

This application claims priority to U.S. Provisional Patent Application Ser. No. 60/510,696, filed on Oct. 10, 2003, entitled "DEVICE BOUND FLASHING/BOOTING FOR CLONING PREVENTION," incorporated herein by reference.

BACKGROUND

Mobile phones generally comprise software applications that may be executed to operate the mobile phone. In addition to enabling a phone with voice communications capabilities, these software applications may enable a phone with various other capabilities, such as text messaging and digital photography. A mobile phone boot image may comprise an operating system and any of a variety of such software applications that may be executed on the mobile phone. The price of a mobile phone may vary based on the quality of the boot image embedded in the phone's flash memory. High-quality boot images may cause particular phones to be more expensive than phones with boot images of lesser quality.

Texas Instruments'® proprietary Open Multimedia Applications Platform ("OMAP") comprises a microprocessing engine that enables communications devices to process data and software applications while extending battery life. A mechanism present in current OMAP devices (i.e., models 161x, 171x, 73x) supports the flashing and booting of boot images using a key that is shared among a plurality of devices. This key helps verify the authenticity of a boot image, but does not prevent the unauthorized copying and re-use of the boot image on a separate phone, resulting in a possible penetrable security gap. Such a security gap may enable unauthorized entities to copy boot images from expensive phones and reproduce the boot images on inexpensive phones. In this way, an unauthorized entity may clone an expensive phone into an unlimited number of inexpensive phones and sell the inexpensive phones for a profit.

In addition to unlawfully copying the boot image, unauthorized entities also may tamper with the contents of the boot image to circumvent existing safeguards that prevent the usage of stolen mobile phones. For example, each mobile phone boot image comprises an International Mobile Equipment Identifier ("IMEI") number that serves as an identification code for the phone in the Global System for Mobile Communication ("GSM") and Third Generation ("3G") networks. The IMEI number is used to grant or deny access to the cellular networks and the networks' services. Generally, if a phone is stolen, the owner may contact his or her cellular service provider (e.g., Sprint®, Verizon®, AT&T®) and have the phone added to a GSM/3G blacklist. Mobile phones found on the blacklist will be denied access to the cellular networks. Thus, an unauthorized entity that steals the phone would not be able to use the phone to access the networks, because the IMEI number of the phone has been added to the blacklist. However, a knowledgeable, unauthorized entity may easily alter the IMEI number of the stolen phone to a number that is not found on the blacklist, thereby gaining access to the cellular networks by way of the stolen phone.

Each year, mobile phone manufacturers lose substantial amounts of revenue due to phone cloning and tampering. Thus, it is desirable to prevent phone cloning and tampering.

BRIEF SUMMARY

The problems noted above are solved in large part by a method and apparatus for binding a boot image and the various contents of a boot image to a mobile communication device. One exemplary embodiment may include downloading a boot image onto a mobile communication device and generating a device-bound certificate ("DBC"). The DBC preferably comprises an authentication code generated using a hashed message authentication code ("HMAC") algorithm and a key specific to the device. The method may further comprise storing the DBC on the boot image, thus binding the boot image to the mobile communication device.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
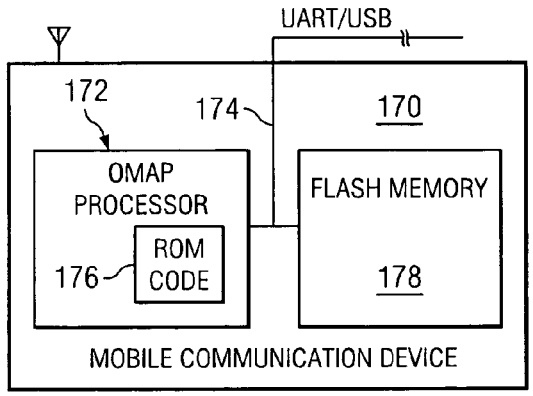
FIG. 1 illustrates a block diagram of a mobile communication device in accordance with embodiments of the invention.

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with the preferred embodiments, per-device "binding" of boot images and boot image contents is provided for a mobile communication device. A boot image that has been downloaded to a mobile phone may be manipulated so that the boot image cannot be copied, altered, or transferred to any other mobile phone. In this way, the boot image is "bound" to the mobile phone. The boot image, once bound to the mobile phone, is valid only for that particular mobile phone. The contents of a boot image also may be bound to a mobile phone in a similar fashion.

Per-device binding of a boot image is accomplished by way of a device-bound certificate ("DBC"). In accordance with the preferred embodiments, a DBC is used to bind a boot image to a particular mobile phone so that the boot image cannot be transferred, altered or otherwise copied to another mobile phone. In a binding process, private data comprising a hashed message authentication code ("HMAC") is stored in the DBC and the DBC subsequently is encrypted with a secret key. In the preferred embodiment, a mobile phone is not permitted to use the boot image without first obtaining the HMAC contained in the DBC. The HMAC thus functions to bind the boot image to the mobile phone. Further, the phone cannot access the HMAC in the DBC without the secret key and only the phone to which the boot image is bound has the secret key. Hence, only the phone with the correct secret key may freely access the contents of the boot image. Thus, per-device binding of a boot image and all contents of the boot image is accomplished by way of a DBC.

Figure 2:
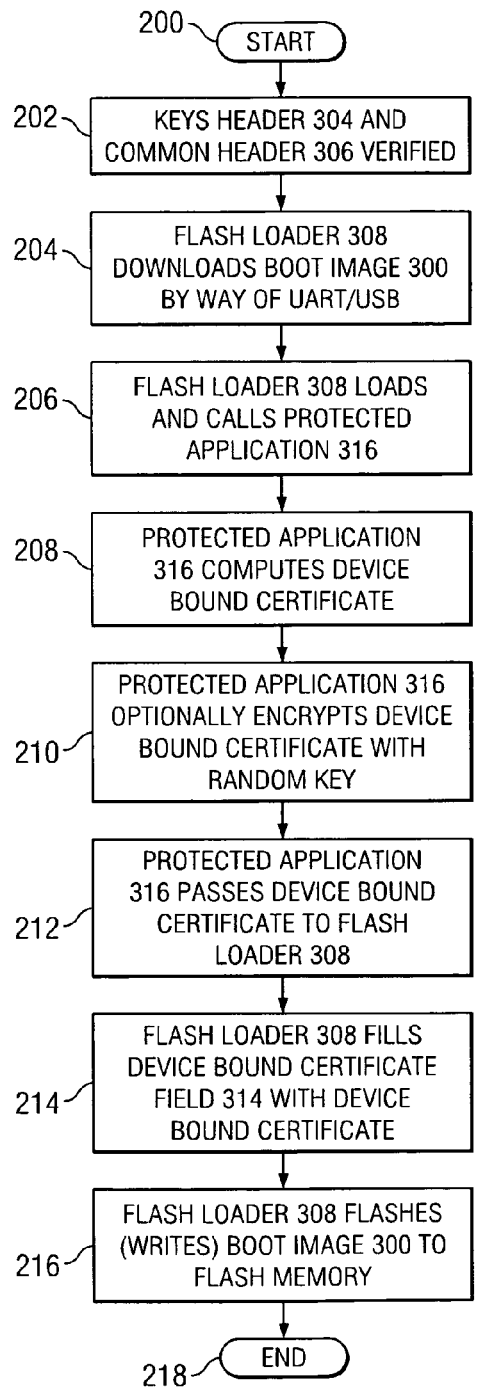
FIG. 2 illustrates an exemplary process implemented on the mobile communication device of FIG. 1.
Figure 3A:
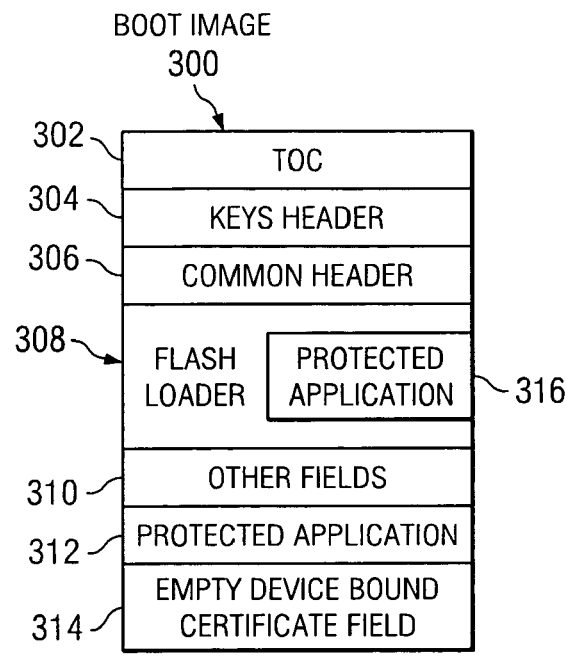
FIG. 3a illustrates a block diagram of a flashing-process boot image in accordance with a preferred embodiment of the invention.

Referring now to FIGS. 1, 2 and 3a, FIG. 1 shows a preferred embodiment of a mobile phone 170 comprising an OMAP processor 172 coupled to a UART/USB port 174, a flash memory 178 and comprising a ROM code (i.e., on-chip firmware) 176. FIG. 2 illustrates a flow diagram describing the process of binding a boot image to the mobile phone 170. FIG. 3a illustrates a boot image 300 comprising a TOC field 302 that describes the contents of the boot image 300, a KEYS header 304 that comprises keys used for cryptographic reasons as described below and a common header 306 that acts as a header for a flash loader 308, which comprises a protected application ("PA") 316. The boot image 300 also may comprise other fields 310, a PA 312 and an empty device-bound certificate ("DBC") field 314. Protected applications are thusly named because the protected applications operate in a secure-mode environment, which may be defined as a hardware-based secure execution environment that is generally tamper-proof.

A binding process may be performed during manufacture of a phone, after the phone has been sold to a consumer, or at any other time. In general, the binding process begins with the creation of a DBC during the flashing process, the filling of the empty DBC field 314 with this DBC, and the subsequent storing of the boot image 300 on the mobile phone 170. More specifically, the binding process may begin with the authentication of the flash loader 308 by the ROM code 176 to ensure the validity of the flash loader 308 (block 202). Once authenticated, the flash loader 308 downloads the boot image 300 by way of a UART/USB port 174 or any appropriate device (block 204). The boot image 300 and other information may be downloaded by a manufacturer or any appropriate entity from any appropriate source, such as the manufacturer's computer systems. In cases where specific items (e.g., an IMEI certificate comprising an IMEI number; SIMlock files) are to be bound to the mobile phone 170, the items may be downloaded in a manner similar to that used to download the boot image 300. Prior to being downloaded, the IMEI certificate preferably is signed by a manufacturer with an Original Equipment Manufacturer Interface ("OEMI") private key. An OEMI public key and the IMEI certificate are both downloaded onto the mobile phone 170, so that the mobile phone 170 may verify the IMEI certificate using the OEMI public key at a later time.

The flash loader 308 subsequently may load and call the PA 316 (block 206). When calling the PA 316, the flash loader 308 sends various parameters, comprising pointers to various components of the boot image 300 (e.g., the common header 306) as well as the values of Creator ID and Application ID found in the common header 306. The Creator ID describes the owner or creator of a DBC and the Application ID serves as an identifier for the application that creates the DBC. The PA 316 may use these pointers and values as necessary.

At least one purpose of the PA 316 is to compute the DBC (block 208), optionally encrypt the DBC with a random key (block 210), and pass the DBC to the flash loader 308 for further processing (block 212). As previously discussed, the PA 316 operates in a secure-mode environment. The PA 316 may begin generating the DBC as follows:

$$HMAC = HMAC_{KEY}(SHA\text{-}1 \text{ (Common Header 306+ Boot Loader)} \| \text{Public Chip ID} \| \text{Creator ID} \| \text{Application ID} \| \text{Reserved Fields}),$$

where "HMAC" denotes a hashed message authorization code, the symbol "∥" denotes concatenation, the Public Chip ID serves as a public identifier for the OMAP PROCESSOR 172, the Reserved Fields contain any information (e.g., an IMEI certificate) and the boot loader is contained in the boot image 300 as described in FIG. 3b below. Specifically, the common header 306 and the boot loader are first hashed together using the commonly-known SHA-1 algorithm, described below. The result is concatenated with various data as shown above (e.g., Public Chip ID, Creator ID). The resulting concatenation is hashed using a key (i.e., KEY) by a commonly-known HMAC cryptographic algorithm, where KEY is generated as:

$$KEY = SHA\text{-}1 \text{ (Chip Specific ID} \| \text{Creator ID} \| \text{Application ID}),$$

and where the Chip Specific ID is a secret identifier created by the ROM code 176 or other system firmware and available only inside secure mode (i.e., during the execution of a PA). A secure hash algorithm SHA-1 is used for computing a "condensed representation" of a message or a data file. The "condensed representation" is of fixed length and is known as a "message digest" or "fingerprint." It is computationally infeasible to produce two messages having the same message digest. This uniqueness enables the message digest to act as a "fingerprint" of the message. For instance, SHA-1 may be used to ensure the integrity of a downloaded or received file by comparing the file hash with the original file hash. Any message or similar construct requiring integrity may be verified in this fashion.

Figure 3B:
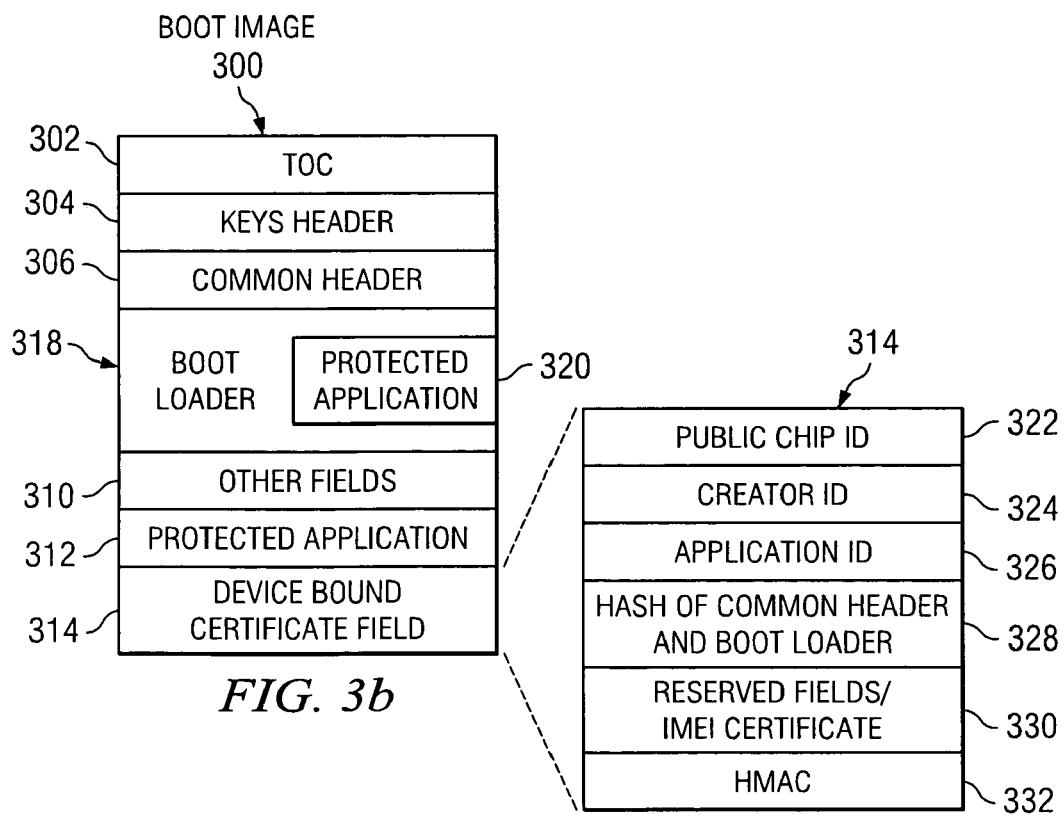
FIG. 3b illustrates a block diagram of a booting-process boot image in accordance with a preferred embodiment of the invention.

The PA 316 completes the DBC computation by assembling a DBC as illustrated in FIG. 3b using information computed by the PA 316 or received from the flash loader 308. Specifically, the completed DBC may comprise a Public Chip ID 322, a Creator ID 324, an Application ID 326, a boot loader/common header hash 328, reserved fields 330 and an HMAC 332 generated as described above. The reserved fields 330 may be filled with an IMEI certificate 330 if an IMEI certificate was downloaded in block 204. The reserved fields 330 also may be filled with any other device-specific information. The PA 316 then may optionally encrypt the DBC with a random, secret key K, computed as:

K=SHA-1 (Chip Specific ID||Creator ID||Application ID).

Encrypting the DBC with a random, secret key K protects all of the contents of the DBC (e.g., the IMEI certificate 330). Once the DBC is encrypted or the encryption step is bypassed, the PA 316 passes the DBC to the flash loader 308 for further processing.

The flash loader 308 receives the DBC from the PA 316 and inserts the DBC into the empty DBC field 314 (block 214), thereby establishing a DBC 314 inside the boot image 300. The flash loader 308 then completes the binding process by flashing (i.e., writing) the boot image 300 to the flash memory 178 of the mobile phone 170 (block 216).

Figure 4:
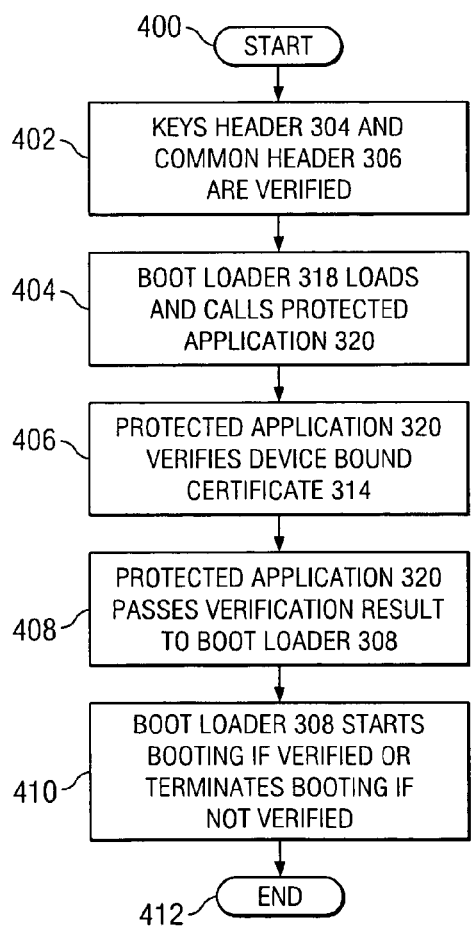
FIG. 4 illustrates a flow diagram of a device bound certificate ("DBC") authorization process in accordance with a preferred embodiment of the invention.

The boot image 300 comprising the DBC 314 and bound to the phone 170 cannot be used until the DBC 314 is authenticated at boot time (i.e., each time the phone is turned on) as illustrated in FIG. 4. That is, the operating system contained in the boot image 300 will not load unless the DBC 314 is first authenticated, thus preventing an end-user from using the phone 170.

Referring now to FIGS. 3b and 4, FIG. 3b illustrates a booting-time boot image 300 comprising a TOC field 302, a KEYS header field 304, a common header 306, a boot loader 308 comprising a PA 320, other fields 310, a PA 312 and a DBC 314. As described above, the DBC 314 comprises a Public Chip ID 322, a Creator ID 324, an Application ID 326, a boot loader/common header hash 328, reserved fields 330 that may comprise an IMEI certificate 330, and the HMAC 332. FIG. 4 illustrates a flow diagram of the process for authenticating a boot image 300 at boot-time. Specifically, the boot-time authentication process may begin with the verification of the KEYS header 304 and the common header 306 by the on-chip ROM code 176 (block 402). The boot loader 318 may load and call the PA 320 using various parameters comprising pointers to the DBC 314, the common header 306 and boot loader 318, and values of the Creator ID 324 and Application ID 326 from the common header 306 (block 404) so the PA 320 may use these pointers and values as necessary.

The PA 320 then may verify the integrity of the DBC 314 and, if applicable, the IMEI certificate 330 (block 406) by first unlocking (i.e., decrypting) the DBC 314 (if the DBC 314 was encrypted) using a key K1 and verifying the IMEI certificate 330 using the OEMI public key that was downloaded onto the mobile phone 170 concurrently with the IMEI certificate 330. The key K1 is computed as follows:

K1=SHA-1 (Chip Specific ID||Creator ID||Application ID).

Although computed separately, the key K1 used to decrypt the DBC 314 during the booting process is identical to the key K used to encrypt the DBC 314 during the flashing process. After the encrypted DBC 314 is unlocked (if applicable), the PA 320 computes:

$HMAC1=HMAC_{KEY1}(SHA\text{-}1$(Common Header 306+ Boot Loader 318)||Public Chip ID 322||Creator ID 324||Application ID 326||Reserved Fields), where the Creator ID 324 and the Application ID 326 are obtained from the DBC 314 and where KEY1 is computed as:

KEY1=SHA-1(Chip Specific ID||Creator ID||Application ID).

The PA 320 subsequently compares the HMAC1 calculated above to the HMAC stored in the DBC 314 to test for a match and passes the result of the comparison to the boot loader 318 (block 408). A match indicates that the boot image 300 has not been copied or altered and may be used by the mobile phone 170 on which the boot image 300 is located. A match also indicates that the contents of boot image 300 (e.g., the IMEI certificate 330) have not been copied or altered and are authentic. In such a case, the booting process would continue as normal. Conversely, a mismatch indicates that the boot image 300 may have been stolen, altered or copied. Thus, the integrity of the contents of the boot image 300 (e.g., the IMEI certificate 330) may have been compromised. In such a case, the booting process would not continue. The boot loader 318 receives the results of this comparison from the PA 320 and proceeds accordingly (block 410), thereby completing the boot-time authentication process.

Although the subject matter disclosed herein is described in terms of the OMAP161x platform, the OMAP 73xplatform, the OMAP 171xplatform or any of a variety of platforms may be used. The above discussion is meant to be illustrative of the principles and various embodiments of the present invention. While the technique for per-device binding of boot image contents is discussed in context of IMEI certificates, the technique may be applied to any device-specific data. Additionally, the scope of disclosure is not limited to the boot image contents as described above. The boot images described above may contain any of a variety of contents, such as R&D certificates used for debugging purposes, a primary protected application ("PPA") that is present in secure random access memory after booting, a PPA certificate, and any other appropriate item. Also, while the above subject matter is primarily discussed in terms of applicability to mobile phones, the subject matter may be used with any mobile communication device. Numerous variations and modifications will become apparent to those skilled in the art once the above disclosure is fully appreciated. It is intended that the following claims be interpreted to embrace all such variations and modifications.

What is claimed is:

1. A method, comprising:
   downloading a boot image onto a mobile communication device;
   generating a device-bound certificate ("DBC"), said DBC comprising an authentication code generated using a hashed message authentication code algorithm and a key specific to said device, and
   storing the DBC in the boot image.

2. The method of claim 1, wherein generating a DBC comprises using an Open Multimedia Applications Platform ("OMAP") read-only memory ("ROM") code.

3. The method of claim 1, wherein generating a DBC comprises executing a protected application in a secure execution environment.

4. The method of claim 1, wherein generating a DBC comprises storing device-specific information in said DBC.

5. The method of claim 4, further comprising verifying authenticity, integrity and unique association of said device-specific information to the mobile communication device during a booting process.

6. The method of claim 5, further comprising interrupting the booting process if said verification is unsuccessful.

7. The method of claim 4, wherein storing device-specific information comprises storing an International Mobile Equipment Identifier number.

8. The method of claim 1, further comprising encrypting the DBC.

9. The method of claim 1, further comprising verifying authenticity and integrity of the authentication code.

10. The method of claim 9, wherein verifying the authenticity and integrity of the authentication code comprises preventing completion of a booting process if said verification is unsuccessful.

11. A mobile communication device, comprising:
a flash memory; and
an OMAP processor comprising a ROM code and coupled to the flash memory, said ROM code adapted to:
generate a device-bound certificate ("DBC");
encrypt the DBC; and
store the DBC on a boot image;
wherein said DBC comprises an authentication code generated using a hashed message authentication code algorithm and a key specific to said device.

12. The device of claim 11, wherein the ROM code verifies authenticity and integrity of the authentication code.

13. The device of claim 12, wherein the ROM code prevents completion of a booting process if said verification is unsuccessful.

14. The device of claim 11, wherein the DBC comprises device-specific information.

15. The device of claim 14, wherein the ROM code further verifies authenticity, integrity and unique association of said device-specific information to the mobile communication device during a booting process.

16. The device of claim 14 further comprising a protected application, wherein said protected application verifies authenticity, integrity and unique association of said device-specific information to the mobile communication device during a booting process.

17. The device of claim 15, wherein the ROM code interrupts the booting process if said verification is unsuccessful.

18. The device of claim 14, wherein the device-specific information comprises an International Mobile Equipment Identifier number.

19. The device of claim 14, wherein the device-specific information comprises at least one SIMlock file.

20. A computer readable medium containing instructions that are executable by a computer system, and when executed the instructions implement a method comprising:

generating a device-bound certificate ("DBC"), said DBC comprising an authentication code generated using a hashed message authentication code algorithm and a key specific to said medium; and storing the DBC on a boot image.

21. The computer readable medium of claim 20, wherein generating a DBC comprises using an OMAP ROM code.

22. The computer readable medium of claim 20, wherein generating a DBC comprises executing a protected application in a secure execution environment.

23. The computer readable medium of claim 20, wherein generating a DBC comprises storing device-specific information in said DBC.

24. The computer readable medium of claim 23, further comprising verifying authenticity and integrity of said device-specific information during a booting process.

25. The computer readable medium of claim 20, wherein the method further comprises verifying authenticity and integrity of the authentication code during a booting process.

26. A mobile communication device, comprising:
a flash memory;
a boot image bound to said flash memory using an authentication code generated by way of a hashed message authentication code algorithm and a key specific to said device; and
an OMAP processor comprising a ROM code and coupled to the flash memory, said ROM code adapted to verify the authenticity and integrity of said authentication code.

27. The device of claim 26, wherein the ROM code prevents completion of a booting process if said verification is unsuccessful.

28. The device of claim 26 further comprising a protected application, wherein said protected application prevents completion of a booting process if said verification is unsuccessful.

29. The device of claim 26, wherein the boot image comprises device-specific information.

30. The device of claim 29, wherein the ROM code verifies authenticity and integrity of said device-specific information and prevents completion of a booting process if said verification is unsuccessful.

* * * * *